United States Patent [19]
Hopkins

[11] Patent Number: 5,760,812
[45] Date of Patent: Jun. 2, 1998

[54] TWO-INPUT, TWO-OUTPUT FUZZY LOGIC PRINT QUALITY CONTROLLER FOR AN ELECTROPHOTOGRAPHIC PRINTER

[75] Inventor: Mark A. Hopkins, Rochester, N.Y.

[73] Assignee: Xerox Corporation, Stamford, Conn.

[21] Appl. No.: 143,610

[22] Filed: Nov. 1, 1993

[51] Int. Cl.⁶ .................. B41J 2/415; B41J 2/385; G03G 9/08; G06F 17/00
[52] U.S. Cl. .................. 347/158; 347/120; 395/61
[58] Field of Search .................. 358/447; 347/11, 347/120, 158, 151, 131; 399/42, 74; 395/22, 1, 3, 60, 61, 77

[56] References Cited

U.S. PATENT DOCUMENTS

| | | | |
|---|---|---|---|
| 4,989,985 | 2/1991 | Hubble, III et al. | 356/445 |
| 5,204,538 | 4/1993 | Genovese | 356/448 |
| 5,204,718 | 4/1993 | Morita | 395/74 |
| 5,204,935 | 4/1993 | Mihara et al. | 395/3 |
| 5,214,476 | 5/1993 | Nomura et al. | 399/30 |
| 5,410,619 | 4/1995 | Fujisawa et al. | 358/447 |

OTHER PUBLICATIONS

Fuzzy Logic in Control Systems: Fuzzy Logic Controller—part I; IEEE Transactions on Systems, Man and Cybernetics, vol. 20 No. 2, Mar./Apr. 1990.

Fuzzy Logic in Control Systems: Fuzzy Logic Controller—Part II; IEEE Transactions on Systems, Man, and Cybernetics, vol. 20 No. 2, Mar./Apr. 1990.

"Panasonic FP-1780 Copier Sales Brochure".

*Primary Examiner*—Benjamin R. Fuller
*Assistant Examiner*—Raquel Yvette Gordon
*Attorney, Agent, or Firm*—Robert Hutter

[57] ABSTRACT

A control system for optimizing print quality in an electrophotographic printer uses a fuzzy-logic technique with only solid-area and half-tone density as control inputs, and only scorotron voltage and ROS laser power as outputs. The measured errors in solid-area and half-tone density are assigned to respective fuzzy-logic error subsets. Joint memberships of the solid-area and half-tone density error subsets are then used to derive error subsets are then used to derive correction values for laser power and scorotron voltage.

5 Claims, 6 Drawing Sheets

| $P_L$ | LARGE NEG | MED NEG | SMALL NEG | NO ERROR | SMALL POS | MED POS | LARGE POS |
|---|---|---|---|---|---|---|---|
| LARGE NEG | 1 | 5 | 5 | 5 | 5 | 5 | 5 |
| MED NEG | 0 | 2 | 3 | 3 | 3 | 4 | 5 |
| SMALL NEG | -3 | 0 | 1 | 1 | 1 | 3 | 5 |
| NO ERROR | -4 | -2 | 0 | 0 | 0 | 2 | 4 |
| SMALL POS | -5 | -3 | -1 | -1 | -1 | 0 | 3 |
| MED POS | -5 | -4 | -3 | -3 | -3 | -2 | 0 |
| LARGE POS | -5 | -5 | -5 | -5 | -5 | -5 | -1 |

*FIG. 6*

| $P_L$ | LARGE NEG | MED NEG | SMALL NEG | NO ERROR | SMALL POS | MED POS | LARGE POS |
|---|---|---|---|---|---|---|---|
| LARGE NEG | 5 | 0 | -4 | -5 | -5 | -5 | -5 |
| MED NEG | 5 | 2 | 0 | -2 | -1 | -4 | -5 |
| SMALL NEG | 5 | 3 | 1 | 0 | -1 | -4 | -5 |
| NO ERROR | 5 | 4 | 1 | 0 | -1 | -4 | -5 |
| SMALL POS | 5 | 4 | 1 | 0 | -1 | -3 | -5 |
| MED POS | 5 | 4 | 1 | 2 | 0 | -2 | -5 |
| LARGE POS | 5 | 5 | 5 | 5 | 4 | 0 | -5 |

Columns: SD ERROR; Rows: HD ERROR

FIG. 7

|  | $\Delta P_L$ | $\Delta V_{grid}$ |
|---|---|---|
| <5> | 0.01575 | 13.5 |
| <4> | 0.00700 | 6.0 |
| <3> | 0.00315 | 2.7 |
| <2> | 0.00140 | 1.2 |
| <1> | 0.00053 | 0.3 |
| <0> | 0 | 0 |
| <-1> | -0.00053 | -0.3 |
| <-2> | -0.00140 | -1.2 |
| <-3> | -0.00315 | -2.7 |
| <-4> | -0.00700 | -6.0 |
| <-5> | -0.01575 | -13.5 |

*FIG. 8*

TWO-INPUT, TWO-OUTPUT FUZZY LOGIC PRINT QUALITY CONTROLLER FOR AN ELECTROPHOTOGRAPHIC PRINTER

The present invention relates to a control system for maintaining print quality in an electrophotographic printer. More specifically, the present invention relates to a control system which uses "fuzzy logic" techniques whereby easily-measured output parameters of a printer may be used to adjust a small number of key input parameters in a system.

If very precise control of an electrophotographic process is desired, a designer of a high-precision system is confronted with a large number of process variables which individually and collectively have a profound effect on ultimate copy or print quality. Among these variables are the initial electrostatic charge placed on a charge-retentive surface, and the output power of a laser or other exposing device; these variables can generally be either set in advance or accurately controlled in the course of use of a printer. Other process variables similarly have significant effects on ultimate print quality, but are not so readily adjusted; such variables include the dark-discharge properties of the charge-retentive surface, the interaction between the power of the initial charging device and the retention of that charge on the charge-retentive surface, and the variables associated with the complex interaction of charges in the development stage. These other important variables are not only difficult to control in an existing system, but the actual effect of any variable on the ultimate print quality may not be perfectly understood by the designer.

Further, the very idea of "print quality" is a flexible concept; what is considered high-quality in one printing context (very high black and white contrast, for example) may be unacceptable in another printing context. Generally, however, print quality can usually be satisfactorily expressed as two values, the optical density (i.e. darkness) of an area intended to be entirely covered with toner (the "solid-area density"), and "half-tone density," which is the correlation between an observed optical density of a half-tone screen of toner and the intended proportion of toner coverage on the surface, such as 50%. Even if these two print quality concepts are precisely defined, however, a translation from a theoretically optimal set of process variables to an optimal set of solid-area and halftone image densities is not easily obtained, and may not in fact perfectly exist. To adapt the system to optimize solid-area optical density may be at cross purposes with half-tone density. There may thus be forced a compromise between the two types of print quality. In addition to this basic compromise, a designer of a printer has only a limited number of process variables which nay be meaningfully adjusted in the course of use of the machine. Thus, the control of even a relatively simple electrophotographic printer presents a designer with only a very small number of opportunities to control the system to obtain the elusive goal of optimal print quality.

In recent years the mathematical technique of "fuzzy logic" has been theorized to obviate the complex, and probably imperfectly understood, multi-variable control of complicated processes such as electrophotography. The article by C. C. Lee, "Fuzzy Logic in Control Systems: Fuzzy Logic Controller, Parts I and II" in *IEEE Transactions in Systems, Man, and Cybernetics*, Vol. 20, no. 2, Mar./Apr. 1990, pp. 404–435, demonstrates some basic mathematical principles underlying the "fuzzy logic" technique.

U.S. Pat. No. 5,204,718 discloses a process control device which uses fuzzy logic; however, this system uses a neural network responsive to a relatively large number of measured physical variables within the system, such as surface potential, degree of continuous use, and temperature and humidity, as inputs to obtain a theoretically optimal control over the toner supply.

U.S. Pat. No. 5,204,935 discloses a fuzzy logic circuit having an operations section memory unit in which the result of an operation to be outputted in response to an input is stored in an address specified by the input. The result of the operation is rewritable, so that the change in the contents of a fuzzy logic operation can be handled merely by rewriting the contents of the memory unit.

U.S. Pat. No. 5,214,476 discloses a fuzzy-logic control system for an image forming apparatus in which one measured input of the system includes the toner concentration in the developing unit sensed by a magnetic sensor.

One purpose of the present invention, in contrast, is to use a fuzzy-logic technique to control print quality in an electrophotographic printer in such a way that the inputs into the system are only those physical parameters which may be relatively easily measured while the printer is in use. Further, the system of the present invention controls the printer in response to these measured parameters by adjusting other physical parameters which are easily manipulated while the printer is in use. In brief, the purpose of the present invention is to take readings of parameters which are easy to measure, and then to adjust parts of the printer which relatively easy to control. By limiting the inputs and outputs to the control system to only what is most readily measured and adjusted, a more practical, less measurement-device-dependent, system may be provided.

According to one aspect of the present invention, there is provided a method of adjusting a plurality of physical parameters in an electrophotographic printing machine. A density of applied toner on the charge-retentive surface in a first area intended to have complete toner coverage thereon is measured, to yield a solid-area density value, and a density of applied toner on the charge-retentive surface in a second area thereof intended to have a predetermined partial toner coverage thereon is measured to yield a halftone-area density value. The solid-area density value and the halftone-area density value are compared to respective optimal values, to yield a solid-density error value and a halftone-density error value. For each of the solid-density error value and the halftone-density error value, proportions of membership of the error value in each of a plurality of error subset spaces are measured, and extents of joint membership of the solid-density error value and the halftone-density error value in each possible error subset space are calculated. The joint membership are fed into a multi-dimensional set of correction values for an adjustable physical parameter associated with the electrophotographic printing machine, each correction value being associated with a unique combination of error subset spaces of the solid-density error value and the halftone-density error value. The extents of joint membership of the solid-density error value and the halftone-density error value in each error subset space are applied as weighted inputs to the set of correction values to yield a weighted correction value for the adjustable physical parameter, and the parameter is then adjusted according to the correction value.

According to another aspect of the present invention, there is provided a system for controlling a electrophotographic printing machine having a charge-retentive surface, a charge source for placing an initial charge on the charge-retentive surface, an exposer for selectably discharging portions of the charge-retentive surface, and a developer for the application of toner on the charge-retentive surface. A program controls the potential applied to the charge source and the power output of the exposer in response to an optical density of applied toner on the charge-retentive surface in a first area intended to have complete toner coverage thereon, and in a second area intended to have a predetermined partial toner coverage thereon.

In the drawings:

FIGS. 6 and 7, are, respectively, tables of scorotron voltage and laser power correction values as functions of error subset membership; and FIG. 8 is a table of conversions of correction values to actual physical parameters for a representative electrophotographic printer.

Figure 1:
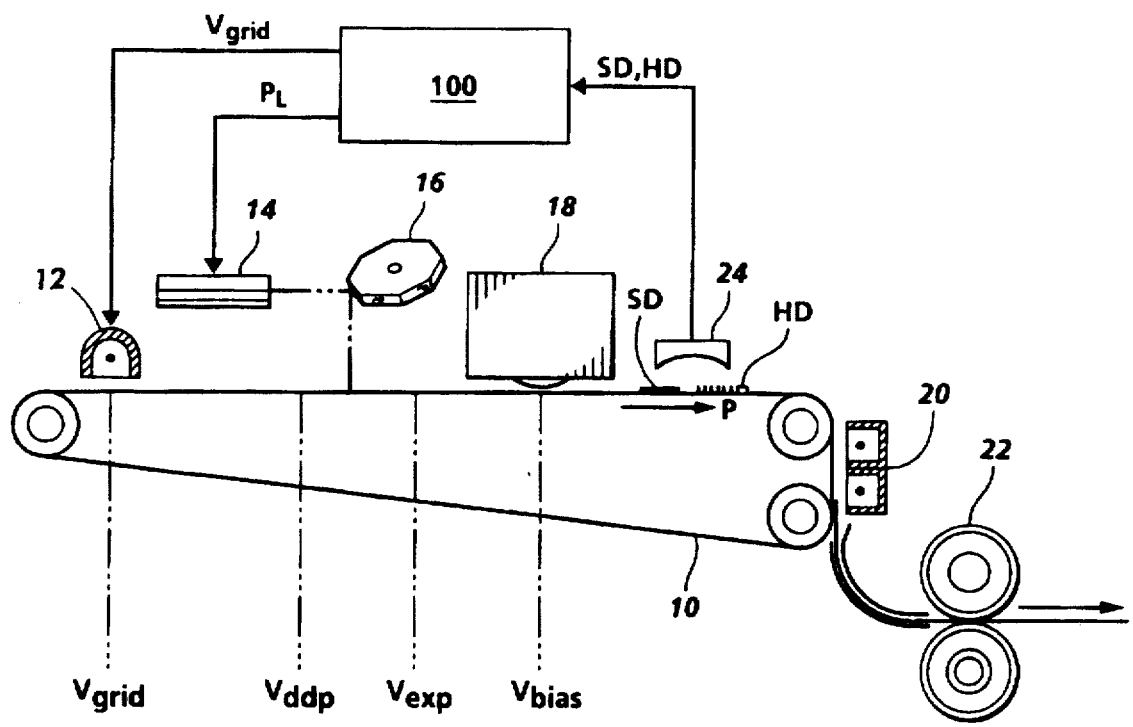
FIG. 1 is a simplified elevational view of the basic elements of an electrophotographic printer.

FIG. 1 shows the basic elements of the well-known system by which an electrophotographic printer, generally known as a "laser printer," uses digital image data to create a dry-toner image on plain paper. There is provided in the printer a photoreceptor 10, which may be in the form of a belt or drum, and which comprises a charge-retentive surface. The photoreceptor 10 is here entrained on a set of rollers and caused to move through process direction P. Moving from left to right in FIG. 1, there is illustrated the basic series of steps by which an electrostatic latent image according to a desired image to be printed is created on the photoreceptor 10, how this latent image is subsequently developed with dry toner, and how the developed image is transferred to a sheet of plain paper. The first step in the electrophotographic process is the general charging of the relevant photoreceptor surface. As seen at the far left of FIG. 1, this initial charging is performed by a charge source known as a "scorotron," indicated as 12. The scorotron 12 typically includes an ion-generating structure, such as a hot wire, to impart an electrostatic charge on the surface of the photoreceptor 10 moving past it. The charged portions of the photoreceptor 10 are then selectively discharged in a configuration corresponding to the desired image to be printed, by a raster output scanner or ROS, which generally comprises a laser source 14 and a rotatable mirror 16 which act together, in a manner known in the art, to discharge certain areas of the charged photoreceptor 10. Although the Figure shows a laser source to selectively discharge the charge-retentive surface, other apparatus that can be used for this purpose include an LED bar, or, conceivably, a light-lens system wherein the light intensity is readily controllable; as used in the claims herein, such a device is indicated as an "exposer." The laser source 14 is modulated (turned on and off) in accordance with digital image data fed into it, and the rotating mirror 16 causes the modulated beam from laser source 14 to move in a fast-scan direction perpendicular to the process direction P of the photoreceptor 10. The laser source 14 outputs a laser beam having a specific power level, here shown as $P_L$, associated therewith.

After certain areas of the photoreceptor 10 are discharged by the laser source 14, the remaining charged areas are developed by a developer unit such as 18 causing a supply of dry toner to contact the service of photoreceptor 10. In the present example, which shows "discharge-area development," the toner 18 will adhere only to those areas on the photoreceptor 10 which do not have a significant electrostatic charge thereon. The developed image is then advanced, by the motion of photoreceptor 10, to a transfer station including a transfer scorotron such as 20, which causes the toner at adhering to the photoreceptor 10 to be electrically transferred to a print sheet, which is typically a sheet of plain paper, to form the image thereon. The sheet of plain paper, with the toner image thereon, is then passed through a fuser 22, which causes the toner to melt, or fuse, into the sheet of paper to create the permanent image. Some of the system elements of the printer shown in FIG. 1 are controlled by a control system 100, the operation of which will be described in detail below.

Figure 2:
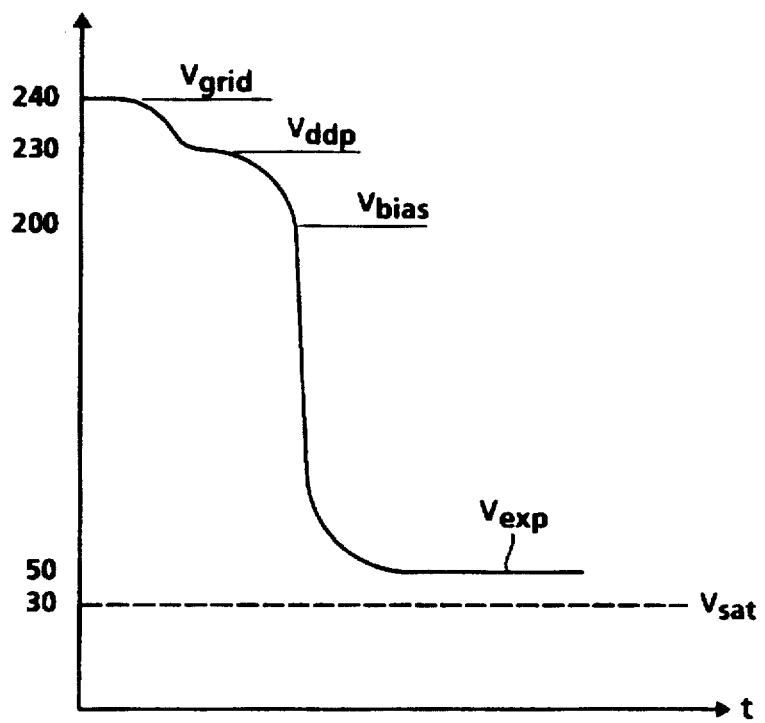
FIG. 2 is a graph showing the relative potentials on a portion of a charge-retentive surface in an electrophotographic printer as it passes through a variety of stations.

Looking now at FIG. 2 and with continuing reference to FIG. 1, the electrostatic "history" of the representative small area on the photoreceptor 10 as it moves through the various stations in the electrophotographic process is described in detail. Here, the charge on the particular area of photoreceptor 10 is expressed in terms of an electrostatic potential (voltage) on that particular area of the surface. Starting with the initial charging of the surface by scorotron 12, an initial high potential $V_{grid}$ is placed on the given area; in this example $V_{grid}$ is 240 volts, but this is by way of example and not of limitation. Once an initial charge is placed on photoreceptor 10, this charge begins to decay immediately, to the extent that, by the time the representative area reaches the ROS, the potential is slightly decreased to a "dark decay potential," or $V_{ddp}$, in this example to 230 volts. At the exposure step, if the particular area in question is to be discharged by the action of the laser 14, the potential on that particular area will be markedly reduced, in this example to a value of $V_{exp}$ of 50 volts, which is low enough to ensure that toner will be attracted thereto, particularly relative to highly charged areas thereon.

Also associated with a system such as this is a bias voltage, $V_{bias}$, which is the voltage applied to the developer housing. The difference between the dark decay potential $V_{ddp}$ and the bias voltage $V_{bias}$ is known as the "cleaning voltage" $V_{clean}$, a value which is relevant to the amount of background development in the system.

Another important parameter in an electrophotographic printer is the "saturation" voltage $V_{sat}$, which is the theoretical maximum possible discharge when the laser source 14 is operating at full power. In the present example, $V_{sat}$ is 30 volts, which is to say that it is generally impossible for a laser of any practical strength to discharge a photoreceptor completely. The value of $V_{sat}$ is generally dependent on the nature of the photoreceptor 10 itself, and the maximum output of the particular laser 14 in the system has a generally asymptotic effect on the value of $V_{sat}$. In many instances, the value of $V_{sat}$ may be considered a constant, because even a great increase in the power of laser source 14 will not have a substantial effect on the value of $V_{sat}$.

The various values of potentials at different stages of the electrophotographic process all have an effect on the overall quality of a print made with the entire system. The idea of "print quality" can be quantified in a number of ways, but two key measurements of print quality are (1) the solid area density, which is the darkness of a representative developed area intended to be completely covered by toner, and (2) the halftone area density, which is the copy quality of a representative area which is intended to be, for example, 50% covered with toner. The halftone is typically created by virtue of a dot-screen of a particular resolution, and although the nature of such a screen will have a great effect on the absolute appearance of the halftone, as long as the same type of halftone screen is used for each test, any common halftone screen may be used. Both the solid area and halftone density may be readily measured by optical sensing systems which are familiar in the art. As shown in the Figure, a densitometer generally indicated as 24 is used after the developing step to measure the optical density of a halftone test patch (marked HD) and a solid test patch (marked SD) created on the photoreceptor 10 in a manner known in the art. Systems for measuring the true optical density of a test patch are shown in, for example, U.S. Pat. No. 4,989,985 or U.S. Pat. No. 5,204,538, both assigned to the assignee hereof.

Various potential values which affect print quality do so in many ways which are not fully understood. More subtly, there is evidence that certain values of potential incidental to the printing process may have effects on other potential values as well, again in ways which are imperfectly understood. Nonetheless, the present invention proposes a system which uses "fuzzy logic" techniques to control this complicated, multi-variable process while using as inputs two readily-measurable output parameters, solid area density and halftone density, and thereby controlling two of the more readily-controlled system inputs, namely the charge voltage of the scorotron 12 and the laser power $P_L$ of laser source 14.

Figure 3:
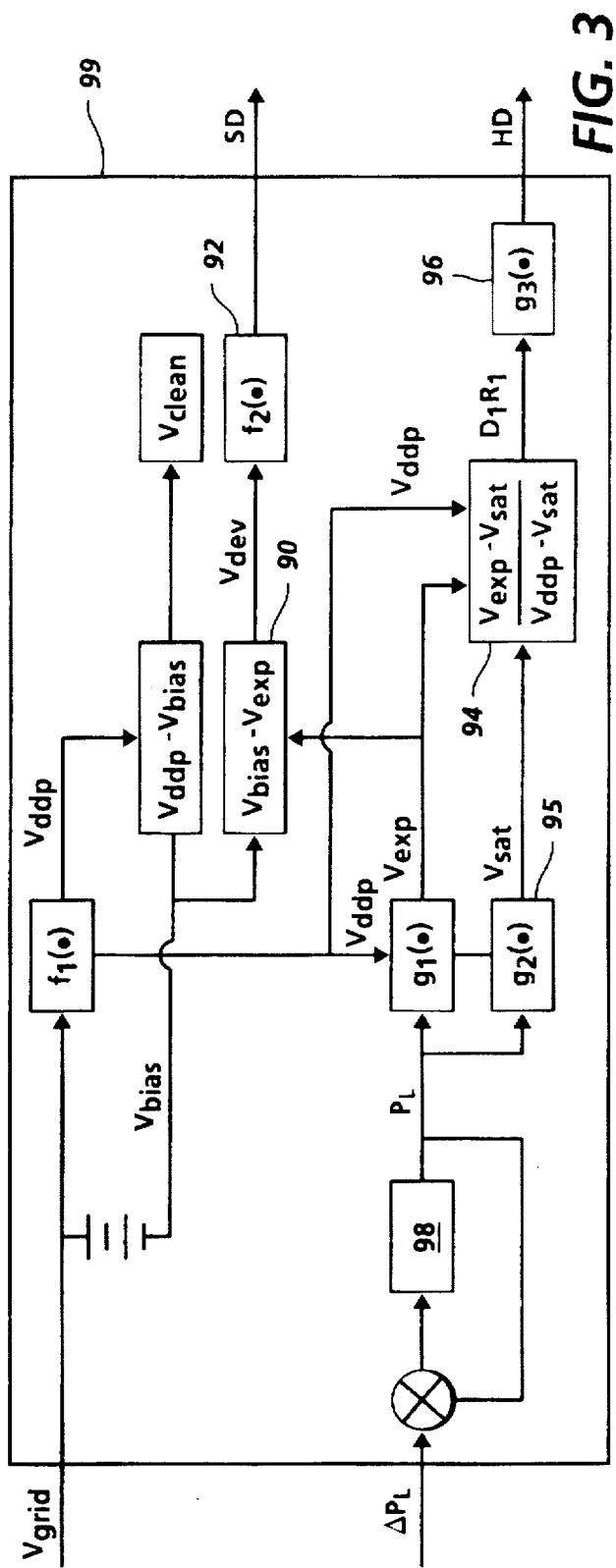
FIG. 3 is a systems diagram showing the interrelationship of various functions and potentials within the representative electrophotographic printer of FIG. 1.

FIG. 3 is a systems diagram showing the basic interactions among the various potentials that are relevant to the electrophotographic process. In the diagram it may be seen that certain relationships between relevant potentials are neatly mathematically related, while more subtle or complicated relationships, such as the relationship of $V_{grid}$ to $V_{ddp}$, are shown as empirical relationships such as $f_1$, $f_2$, $g_1$, $g_2$, and $g_3$. Certain relationships of interest that may be seen in FIG. 3 include the fact that $V_{bias}$ is typically of a fixed relationship with $V_{grid}$ and that another relevant potential is the development voltage $V_{dev}$, which is the difference between $V_{bias}$ and $V_{exp}$, shown at the box indicated as 90, and which has been shown to have an empirical relationship, through a function $f_2$ in box 92, to the solid area density SD. Also significant is the concept of the "discharge ratio," which is theorized to have a highly correlative relationship, such as through a function $g_3$ in box 96, to the halftone density HD. This discharge ratio indicated in box 94 is given as a ratio shown in FIG. 3, which takes into account the saturation voltage $V_{sat}$ of the particular photoreceptor, which, incidentally, is also related somewhat to the laser power $P_L$ by a relationship $g_2$ indicated in box 95, although the value of $V_{sat}$ has been found to be substantially constant for a given apparatus.

It will be noted that the complex Interactions among the various potentials in the electrophotographic process are here organized into a single "black box" indicated as 99, with the relevant inputs and outputs being limited to those outputs which may be readily measured, and those inputs which may be readily controlled. Namely, the relevant outputs of black box 99 are the solid area density SD and the halftone density HD. By the same token, the inputs to the black box 99 are the voltage associated with the scorotron 12, shown as $V_{grid}$, and the power of laser source 14, here shown as either $P_L$ (the scalar value of the power itself) or, depending on the nature of the control system, on the change in the laser power relative to a point at a predetermined time in the past, here indicated as $\Delta P_L$.

Figure 4:
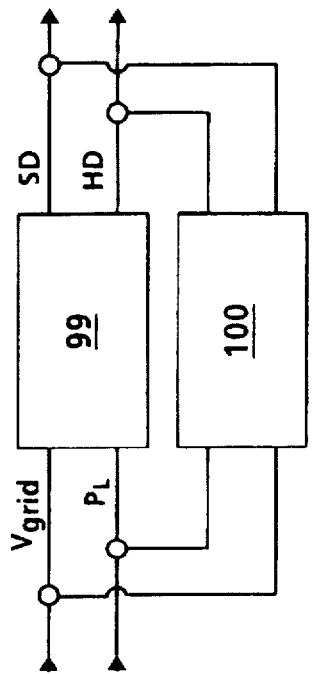
FIG. 4 is simplified schematic diagram showing the relationship of the control system of the present invention with certain key parameters of an electrophotographic printer.

FIG. 4 shows how the black box approach to the control of the electrophotographic process is dependent exclusively on these two inputs and these two outputs. As with any control technique, the control system of the present invention, here generally shown as 100, monitors the available outputs HD and SD, and compares them to predetermined optimal values which would be output by a "perfect" system. The actual monitored values of HD and SD are compared to the optimal values, to yield an error value for each measured parameter. Returning briefly to FIG. 1, it can be seen that the control system 100 is operatively connected to the densitometer 24, which is adapted to detect the HD and SD values from test patches on photoreceptor 10. Similarly, the effective outputs of control system 100 are values ultimately affecting the physical values of $V_{grid}$ and $P_L$.

Figure 5:
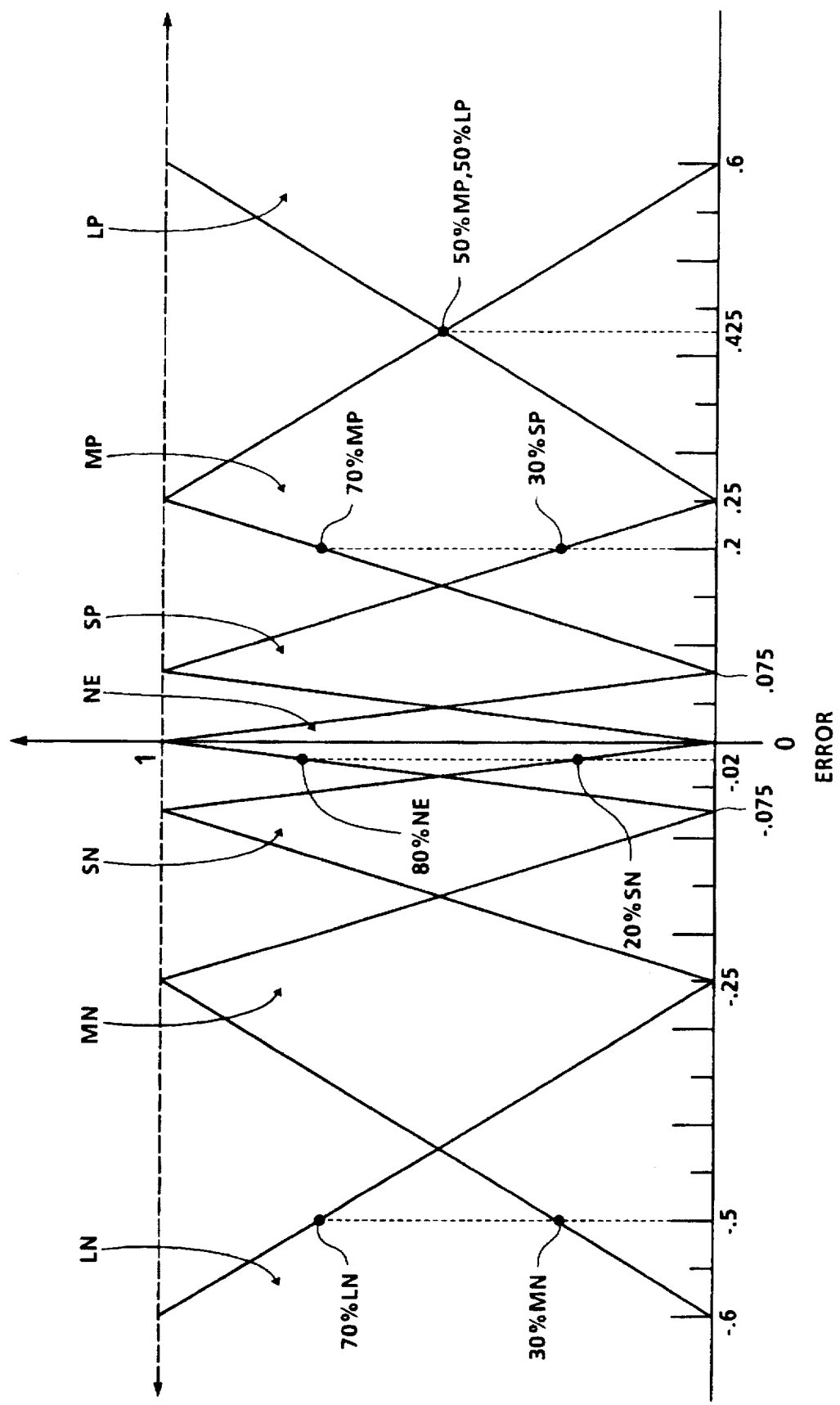
FIG. 5 is a graph illustrating a "fuzzy logic" procedure as applied to discrete error subset relating to the electrophotographic printer of FIG. 1.

One essential feature of the "fuzzy logic" control technique is that, instead of assigning a measured error value among discrete ranges along a purely linear scale, the error value is construed as being, to one extent or another, in a plurality of "error subsets." The scale of possible error values are divided into usable ranges, such as no error, small positive, small negative, medium positive, medium negative, large positive, and large negative. Whereas a straightforward scalar system may begin one error range where another ends (such as between a medium positive and a large positive), the fuzzy logic technique proposes that the various error ranges, known as error subset spaces, overlap to usually symmetrical extents. Thus, a single scalar value of an error may be construed as being partially within one error subset space, and partially within another error subset space. An example of this technique is shown by the graph of FIG. 5. The horizontal axis of the graph shows a range relative to zero error, in which a measured error value may fall, from a large negative to a large positive. The vertical axis of the graph represents a proportion, from 0 to 1, of how much a given value on the horizontal axis will be disposed within a number of error subset spaces. The variety of diagonal lines superimposed on the graph indicate, in a linear sense, how much a measured error on the horizontal axis will be within each error subset. The center triangle, corresponding to the error value of −0.75 to +0.75, is in this example construed as being the "no error" NE subset. The measured error need not be exactly zero to place the measured error to some extent in the "no error" subset; however, as a measured error "moves away from" scalar zero, the measurement is considered to be less and less in the no-error subset. Further in this example, the error value from 0 to .25 is considered the "small positive" (SP) error subset, from .075 to 0.6 the "medium positive" (MP) error subset, and above 0.25 the "large positive" (LP) subset. As can be seen in FIG. 5, a symmetrical arrangement exists for the negative portion of the graph. It will further be noticed that a decreasing extent of one error set is matched by a complementary increase in a neighboring set for the same location along the horizontal axis; for example, for a horizontal value from .075 to 0.25, as the extent of the SP error subset decreases, the extent of the MP error subset increases in an exactly complementary fashion.

To illustrate how the error subset technique is applied, a number of examples are shown along the horizontal axis. For purposes of the example, consider, as shown, a measured error of +0.2. According to the illustrated scheme, the value of +0.2 along the horizontal axis is 30% in the small positive (SP) error subset and 70% in the medium positive (MP) error subset. As the measured error value approaches 0.25, more of the error value will be in the MP subset and less in the SP subset. To take another example, if the measured error value is 0.425, as shown, this measured error value is equally in the MP and LP error subsets. Further, any error value above 0.6 in this example is 100% in the LP error subset. Thus, the fuzzy logic technique exploited in the present invention converts a single error number (taken from either the HD or SD measured value) and converts it into a proportion among a plurality of error subsets. (Although, in the given example, only two error subset spaces overlap at any time along the horizontal axis, it is conceivable that more than two error subset spaces may be provided for a given point along the horizontal axis; further, it is not necessary that the proportions of a given value along the horizontal axis for all error subsets in which it appears add up to 1.)

Returning to the practical application of the present invention, a useful physical measurement for evaluating either halftone density (HD) or solid-area density (SD) in an electrophotographic printer is the unitless "density unit" which is well-known in the art. For application to a scheme such as illustrated in FIG. 5, it is conceivable that the horizontal axis merely represents a difference between the measured density unit for either the HD or SD compared to the respective optimal value for each output parameter.

The "black box" construction of the electrophotographic system which is handled by the fuzzy-logic control system of the present invention presents a practical problem which is believed to be particularly conducive to fuzzy-logic analysis. Referring back to FIG. 3, the complex interactions within the box 99 suggest that adjusting the two inputs $V_{grid}$ and $P_L$ for optimization of one output variable may have a surprising, or at least significant and unintended, effect on the other output. Not all of the relationships within the black box 99 are deliberately constructed by the designer of the electrophotographic printer; certain key relationships within the black box are due to physical reactions, such as within the structure of the photoreceptor 10, which are imperfectly understood, much less deliberately intended. A system optimized for the best HD may necessarily be optimized at the expense of SD, and vice-versa. The fuzzy-logic technique of the present invention is believed to provide a fast responsive technique of satisfactorily optimizing both outputs simultaneously.

Once an error value for each output HD and SD is obtained by comparison of monitored outputs with respective optimal values, the two error values are each "fed through" a conversion algorithm, such as that represented by FIG. 5, to express each error value as belonging to as many as two error subsets. Suppose, for example, that the SD error is found to be −0.5. Plugged into an algorithm such as in FIG. 5, as shown, this scalar error value corresponds to being 70% in the large negative (LN) error subset and 30% in the medium negative (MN) error subset. The error value is also, of course, of a 0% membership in all other error subsets. Simultaneously, suppose that the measured HD error is found to be −0.02, and, plugging this scalar value into FIG. 5, this scalar value is 20% in small negative (SN) and 80% in "no error" (NE). The two scalar values have been converted into proportional values of 4 error subsets.

The next step is to apply these values for the error subsets to a set of "magnitude correction tables," which are shown for the present example as FIGS. 6 (for the adjustment of the laser source power) and FIG. 7 (for the adjustment of $V_{grid}$). It will be noted in each table that the column headings in the table correspond to the error subsets for the SD error, and the row headings correspond to the error subsets for the HD error. Each square within each table, then, corresponds to a unique combination of error subsets and responds thereto with a correction value from −5 to +5, for the respective input parameter of the table. (As will be described in detail below, each of these unitless correction values is directly related, typically by means of a look-up table, to a physical adjustment in either $P_L$ or $V_{grid}$, and these specific values will be empirically dependent on the actual apparatus.) Because each error output from the algorithm of the graph of FIG. 5 is expressed as a proportion among two error subsets, two rows and columns of each table are relevant to a given control step.

Continuing the above example, there is an SD error which is 70% (0.7) in LN and 30% (0.3) in MN, with an HD error which is 20% (0.2) SN and 80% (0.8) in NE. There are thus four entries in each table that are of interest, and the entries which are called upon in the above example are represented by the shaded combinations in FIGS. 6 and 7.

The next steps represent the "defuzzification" of the correction values from the tables into actuation adjustments. As shown by the shaded areas of FIGS. 6 and 7, there are four entries in each table that are of interest, which were referenced by the relevant error subsets in the example. Weights are assigned to each of these four entries on the basis of the joint membership of the two errors in the indicated conditions, which is obtained by looking at corresponding squares in each table and taking the minimum of the two memberships:

Joint membership {SD Error =LN, HD Error =NE}=min (0.7, 0.8) =0.7
Joint membership {SD Error =MN, HD Error =NE}=min (0.3, 0.8) =0.3
Joint membership {SD Error =LN, HD Error =SN}=min (0.7, 0.2) =0.2
Joint membership {SD Error =MN, HD Error =SN}=min (0.3, 0.2) =0.2

After all four joint memberships have been computed, the values are weighted so that the sum of all the joint memberships is 1.00 by dividing each value by the sum of all the joint memberships, which in this case is 1.4. The fuzzy correction values for this example can then be extracted from each table as a weighted average of the four relevant entries (squares) in each table:

$P_L$ adjustment ={0.7*<−4>+0.3*<−2>+0.2*<−3>+0.2*<0>}/1.4

$V_{grid}$ adjustment ={0.7*<5>+0.3* <4>+0.2*<5>+0.2*<3>}/1.4

The numbers inside the <>brackets are pointers to the various fuzzy actuator correction subsets within the respective squares, from which specific adjustment values are obtained to substitute into the equations, yielding so-called "crisp" values for the corrections. As mentioned above, the correction values from the tables are directly related to empirically-determined physical parameters for $P_l$ and $V_{grid}$ for the specific printing apparatus (or type or model of apparatus) being controlled. An example look-up table, which may be readily embodied in software, for a typical printing apparatus is shown in the table of FIG. 8. It will be noted that this specific example references not absolute values of the physical parameters, but adjustments thereto; however, the nature of the determined change in the inputs can be adapted for a specific design of the printer. Using the looked-up physical values from the table of FIG. 8, the actual physical adjustments to the inputs of black box 99 can be computed by substitution:

$P_L$ adjustment ={0.7*<−0.007>+0.3*<−0.0014>+0.2*<−0.00315>+ 0.2*<0>}/1.4 =−0.00425 (fraction of full power)

$V_{grid}$ adjustment ={0.7*<13.5>+0.3*<6.0>+0.2*<13.5>+0.2*<2.7>}/1.4 =+10.35 volts.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A method of adjusting parameters in an electrophotographic printing machine, the parameters relating to adjustable physical conditions of the electrophotographic printing machine, a first one of the parameters being a potential of a charge source for creating an initial charge on a charge-retentive surface in the printing machine or a power associated with an exposer which imagewise discharges a portion of the charged charge-retentive surface, comprising the steps of:

- measuring a density of applied toner on a charge-retentive surface in a first area thereof intended to have complete toner coverage thereon, to yield a solid-area density value;
- measuring a density of applied toner on the charge-retentive surface in a second area thereof intended to have a predetermined partial toner coverage thereon, to yield a halftone-area density value;
- comparing the solid-area density value and the halftone-area density value to respective optimal values, to yield a solid-density error value and a halftone-density error value;
- determining, for each of the solid-density error value and the halftone-density error value, proportions of membership of the error value in each of a plurality of error subset spaces;
- determining extents of joint membership of the solid-density error value and the halftone-density error value in each possible error subset space;
- providing a multi-dimensional set of correction values for the first parameter, each correction value being associated with a unique combination of error subset spaces of the solid-density error value and the halftone-density error value;
- applying the extents of joint membership of the solid-density error value and the halftone-density error value in each error subset space as weighted inputs to the set of correction values, to yield a weighted correction value for the first parameter; and
- adjusting the first parameter according to the correction value.

2. The method of claim 1, further comprising the steps of:

- providing a second multi-dimensional set of correction values for a second one of the parameter, the second parameters being a potential of a charge source for creating an initial charge on the charge-retentive surface in the printing machine or a power associated with the exposer which imagewise discharges a portion of the charged charge-retentive surface, the second parameter being different from the first parameter, each correction value in the second multi-dimensional set being associated with a unique combination of error subset spaces of the solid-density error value and the halftone-density error value;
- applying the extents of joint membership of the solid-density error value and the halftone-density error value in each error subset space as weighted inputs to the second set of correction values, to yield a weighted correction value for the second parameter; and
- adjusting the second parameter according to the correction value.

3. In an electrophotographic printing machine, a method of adjusting a potential applied to a charge source and a power output of an exposer for optimal print quality, comprising the steps of:

- measuring a density of applied toner on a charge-retentive surface in a first area thereof intended to have complete toner coverage thereon, to yield a solid-area density value;
- measuring a density of applied toner on the charge-retentive surface in a second area thereof intended to have a predetermined partial toner coverage thereon, to yield a halftone-area density value;
- comparing the solid-area density value and the halftone-area density value to respective optimal values, to yield a solid-density error value and a halftone-density error value;
- determining, for each of the solid-density error value and the halftone-density error value, proportions of membership of the error value in each of a plurality of error subset spaces;
- determining extents of joint membership of the solid-density error value and the halftone-density error value in each possible error subset space;
- providing a first multi-dimensional set of correction values for a potential applied to the charge source, each correction value being associated with a unique combination of error subset spaces of the solid density error value and the halftone-density error value;
- providing a second multi-dimensional set of correction values for a power output of the exposer, each correction value being associated with a unique combination of error subset spaces of the solid-density error value and the halftone-density error value;
- applying the extents of joint membership of the solid-density error value and the halftone-density error value in each error subset space as weighted inputs to each set of correction values, to yield a weighted correction value for the potential applied to the charge source and the power output of the exposer; and
- adjusting the potential applied to the charge source and the power output of the exposer according to the respective correction values.

4. A method of controlling an electrophotographic printing machine having a plurality of processing stations wherein toner is applied to a charge-retentive surface, said processing stations including a charge source for placing an initial charge on the charge-retentive surface and an exposer for selectably discharging portions of the charge-retentive surface, comprising the steps of:

- accepting as inputs a measured optical density of applied toner on the charge-retentive surface in a first area thereof intended to have a first predetermined extent of toner coverage thereon, and a measured optical density of applied toner on the charge-retentive surface in a second area thereof intended to have a second predetermined extent of toner coverage thereon;
- assigning each input to at least one fuzzy-logic error subset; and
- deriving an adjustment parameter relating to at least one processing station, at least in part from an extent of joint membership of a plurality of inputs in a fuzzy-logic error subset, wherein the deriving step includes deriving an adjustment parameter for controlling either a potential of a charge source for placing an initial charge on the charge-retentive surface or a power associated with an exposer for selectably discharging portions of the charge-retentive surface.

5. The method of claim 4, wherein the first area of the charge-retentive surface to have complete toner coverage thereon, and intending the second area of the charge-retentive surface to have a predetermined partial toner coverage thereon.

* * * * *